(12) United States Patent
Lee et al.

(10) Patent No.: US 9,924,523 B2
(45) Date of Patent: Mar. 20, 2018

(54) METHOD FOR TRANSMITTING INTERFERENCE INFORMATION AND DEVICE FOR SAME

(71) Applicant: LG ELECTRONICS INC., Seoul (KR)

(72) Inventors: Hyunho Lee, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 15/030,570

(22) PCT Filed: Nov. 11, 2014

(86) PCT No.: PCT/KR2014/010794
§ 371 (c)(1),
(2) Date: Apr. 19, 2016

(87) PCT Pub. No.: WO2015/072720
PCT Pub. Date: May 21, 2015

(65) Prior Publication Data
US 2016/0262165 A1   Sep. 8, 2016

Related U.S. Application Data

(60) Provisional application No. 61/903,350, filed on Nov. 12, 2013, provisional application No. 61/916,290, (Continued)

(51) Int. Cl.
*H04W 72/08* (2009.01)
*H04J 11/00* (2006.01)
(Continued)

(52) U.S. Cl.
CPC ......... *H04W 72/082* (2013.01); *H04J 11/005* (2013.01); *H04L 5/0094* (2013.01); *H04W 28/048* (2013.01); *H04W 72/0406* (2013.01)

(58) Field of Classification Search
CPC ............ H04W 72/082; H04W 28/048; H04W 72/0406; H04J 11/005; H04L 5/0094
See application file for complete search history.

(56) References Cited

U.S. PATENT DOCUMENTS

2010/0309861 A1* 12/2010 Gorokhov ............ H04B 1/7103
370/329
2012/0281683 A1* 11/2012 Falconetti ............ H04J 11/0023
370/336

(Continued)

FOREIGN PATENT DOCUMENTS

WO   2013005904   1/2013
WO   2013025051   2/2013

(Continued)

OTHER PUBLICATIONS

PCT International Application No. PCT/KR2014/010794, Written Opinion of the International Searching Authority dated Feb. 26, 2015, 18 pages.

*Primary Examiner* — Chi H Pham
*Assistant Examiner* — Weibin Huang
(74) *Attorney, Agent, or Firm* — Lee Hong Degerman Kang Waimey

(57) ABSTRACT

According to one embodiment of the present invention, a method for receiving information for canceling interference of a terminal is disclosed. The method is performed by the terminal and can comprise the steps of: receiving, from a serving base station, information on the allocation of resource regions of neighboring cells for canceling an interference signal; and using the resource region allocation information in order to cancel the interference signal in a downlink signal.

14 Claims, 7 Drawing Sheets

[case 1]

[case 2]

subcarrier

Related U.S. Application Data filed on Dec. 16, 2013, provisional application No. 61/930,467, filed on Jan. 22, 2014, provisional application No. 61/954,581, filed on Mar. 17, 2014.

(51) Int. Cl.
*H04W 28/04* (2009.01)
*H04W 72/04* (2009.01)
*H04L 5/00* (2006.01)

(56) References Cited

U.S. PATENT DOCUMENTS

| | | | | |
|---|---|---|---|---|
| 2013/0114437 A1* | 5/2013 | Yoo | ............... | H04J 11/005 370/252 |
| 2013/0114438 A1* | 5/2013 | Bhattad | ............... | H04J 11/005 370/252 |
| 2015/0358100 A1* | 12/2015 | Jung | ............... | H04J 11/005 370/329 |

FOREIGN PATENT DOCUMENTS

| WO | 2013066018 | 5/2013 |
|---|---|---|
| WO | 2013133599 | 9/2013 |
| WO | 2013133607 | 9/2013 |

* cited by examiner

METHOD FOR TRANSMITTING INTERFERENCE INFORMATION AND DEVICE FOR SAME

CROSS-REFERENCE TO RELATED APPLICATIONS

This application is the National Stage filing under 35 U.S.C. 371 of International Application No. PCT/KR2014/010794, filed on Nov. 11, 2014, which claims the benefit of U.S. Provisional Application Nos. 61/903,350, filed on Nov. 12, 2013, 61/916,290, filed on Dec. 16, 2013, 61/930,467, filed on Jan. 22, 2014 and 61/954,581, filed on Mar. 17, 2014, the contents of which are all hereby incorporated by reference herein in their entirety.

TECHNICAL FIELD

The present invention relates to a wireless communication system, and more particularly, to a method of transceiving information for cancelling interference and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

An object of the present invention is to propose a method of transmitting and receiving information for cancelling interference and a more efficient interference cancellation operation based on the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving information for cancelling interference of a user equipment, which is performed by the user equipment, includes the steps of receiving resource region allocation information of a neighboring cell from a serving base station to cancel an interference signal and using the resource region allocation information to cancel the interference signal from a downlink signal.

Additionally or alternately, the method can further include the step of receiving control information to detect the interference signal corresponding to resource allocation unit information.

Additionally or alternately, the method can further include the step of performing blind detection on the interference signal in a resource indicated by the resource region allocation information using the control information.

Additionally or alternately, the resource region allocation information can indicate resources including an identical interference characteristic.

Additionally or alternately, the resource region allocation information can indicate resources to which an identical PMI is applied.

To further achieve these and other advantages and in accordance with the purpose of the present invention, according to a different embodiment, a user equipment configured to receive information for cancelling interference can include an RF (radio frequency) unit and a processor configured to control the RF unit, the processor configured to receive resource region allocation information of a neighboring cell from a serving base station to cancel an interference signal, the processor configured to use the resource region allocation information to cancel the interference signal from a downlink signal.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, it is able to obtain an efficient interference cancellation result by transmitting and receiving information for cancelling interference and expect information signaling of a base station for efficiently cancelling interference.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
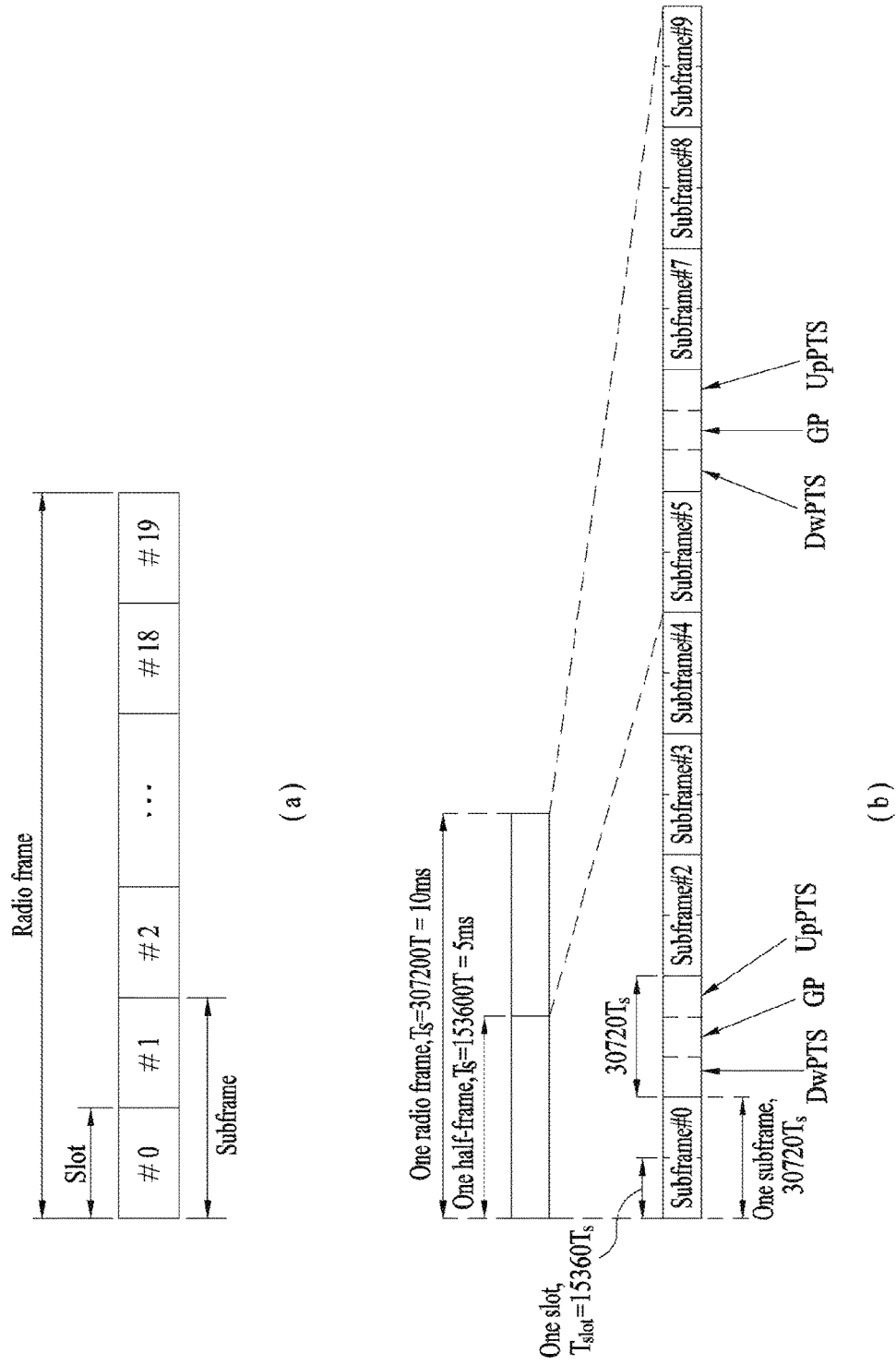
FIG. 1 is a diagram for an example of a radio frame structure used in wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

Figure 2:
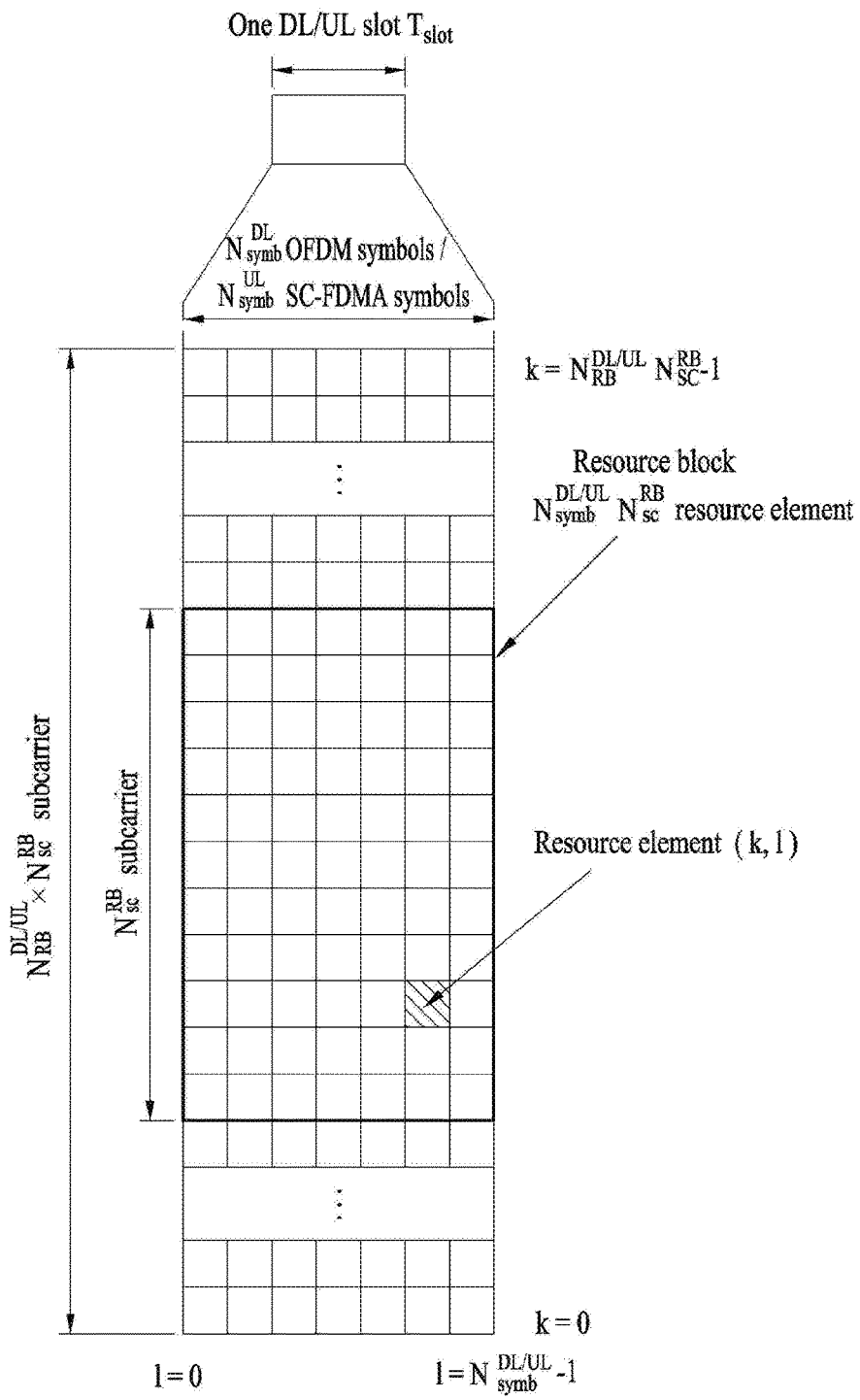
FIG. 2 is a diagram for an example of a downlink (DL)/uplink (UL) slot structure in a wireless communication system.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of

TABLE 2

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | 12800 · $T_S$ | | |
| 8 | 24144 · $T_S$ | | | — | — | — |
| 9 | 13168 · $T_S$ | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$ and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
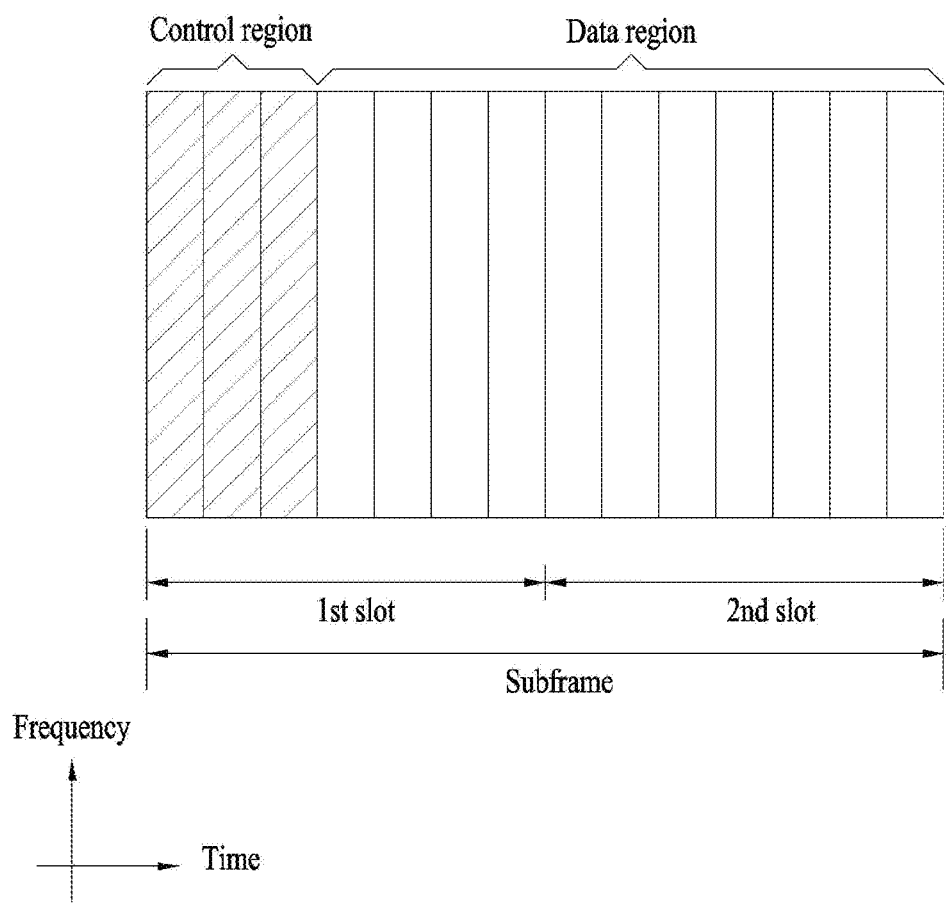
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot.

Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
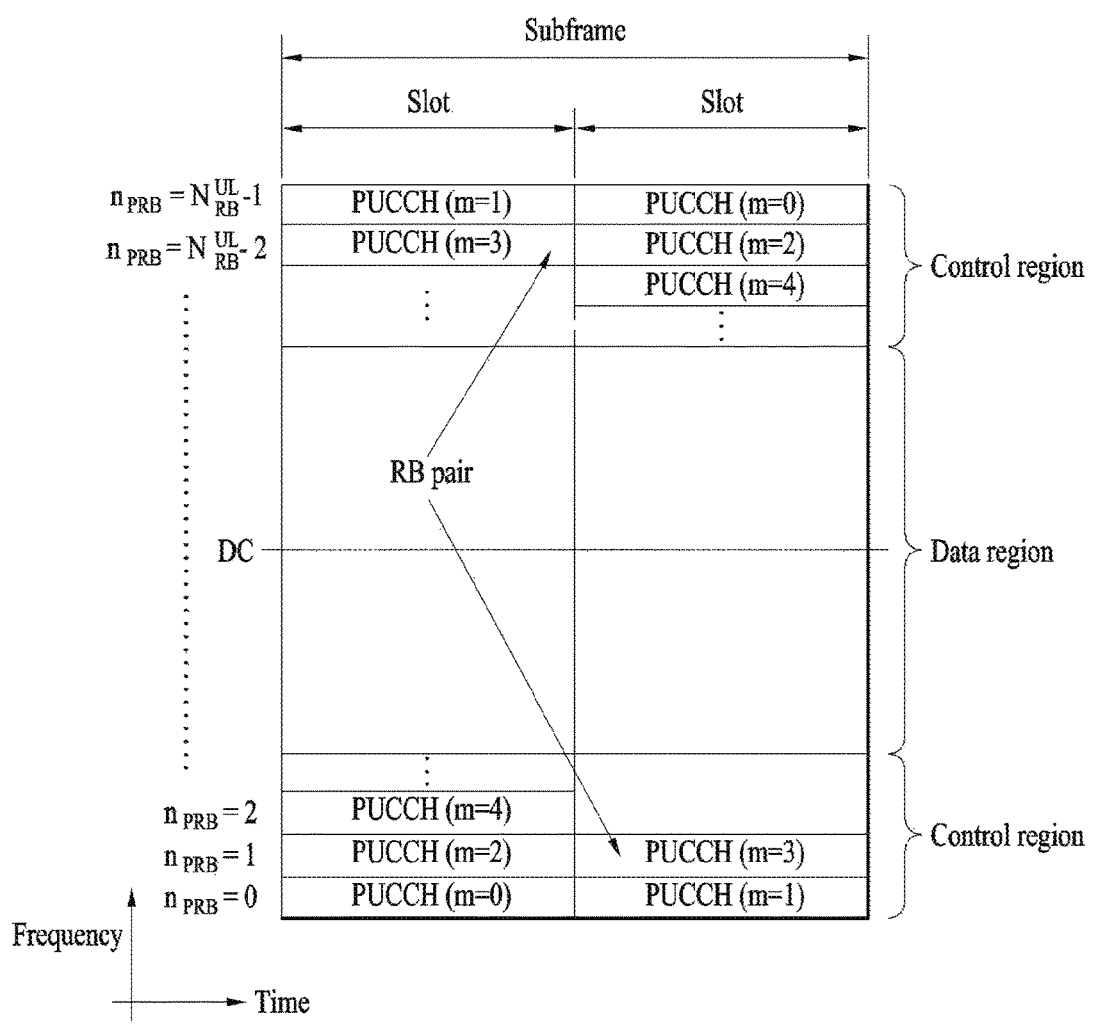
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

PRB Bundling

PRB bundling (bundling) corresponds to a concept of applying an identical PMI to a plurality of adjacent RBs (resource blocks) when data is transmitted. An RB size to which the identical PMI is applied is determined according to an available frequency range.

More specifically, if PMI/RI feedback is configured, a UE can assume that a precoding granularity corresponds to a plurality of RBs in frequency domain. A system bandwidth dependent-precoding resource block group (PRG) of P' size divides a system bandwidth with each other and each PRG consists of contiguous PRBs. If $N_{RB}^{DL}$ mod P' is greater than 0, one of the PRGs has a size of $N_{RB}^{DL} - P' \lfloor N_{RB}^{DL}/P' \rfloor$, A PRG size is not an ascending order in a lowest frequency. A UE can assume that an identical precoder is applied to all scheduled PRBs in a PRG.

A PRG size capable of being assumed by a UE in a given system bandwidth is shown in Table 4 in the following.

TABLE 4

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

In an enhanced wireless communication system such as LTE Rel-12, discussion on a network-based interference cancellation scheme or a NAICS (network assisted interference and suppression) scheme for cancelling interference data from a neighboring cell or a transmission point based on a help of a network is in progress.

Hence, when a UE equipped with NAICS capability intends to cancel/mitigate an interference signal received from a neighboring base station, the present invention explains a method of providing information on resource region allocation and a method of utilizing the information for cancelling/mitigating the interference signal. In this case, the UE equipped with the NAICS capability is referred to as a "NAICS UE" and a base station transmitting the interference signal affecting the NAICS UE is referred to as an "interference base station".

In order for the NAICS UE to efficiently perform interference cancellation/mitigation, it may be necessary to have information on resource region allocation of the interference base station. The information may include information on whether or not PRB (physical resource block) bundling is performed, information on a resource allocation type (distributed/localized) and the like.

The NAICS UE requires not only the aforementioned information but also various control informations (e.g., TM, RI, modulation order, TPMI, etc.) corresponding to an interference signal to cancel/mitigate interference. The control information can be directly received from a base station or can be inferred through blind detection. If PRB bundling is performed, single PDSCH (physical downlink shared channel) is identically precoded in a PRB group unit and a UE can perform blind detection in the PRB group unit. In the present specification, the control informations except the information on the resource region allocation are referred to as "NA (network-assisted) information".

Figure 5:
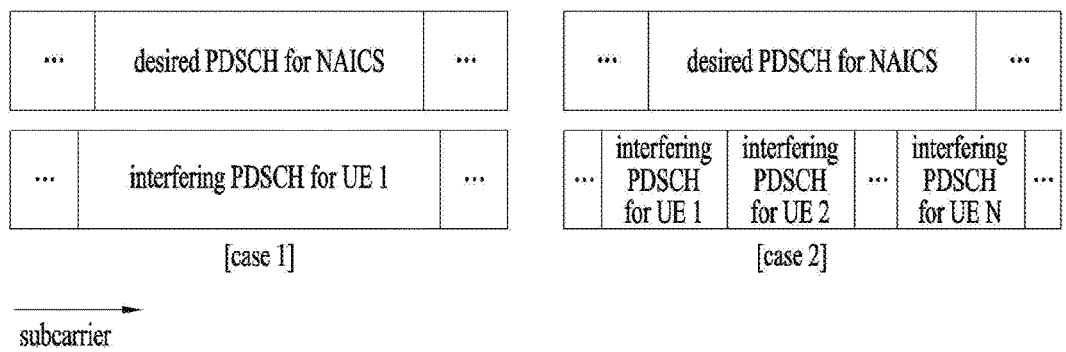
FIG. 5 is a diagram for an example of resource region allocation of a serving base station and an interference base station.

FIG. 5 is a diagram for an example of resource region allocation of a serving base station and an interference base station. If there exist lots of PDSCHs to be assigned to a UE of low traffic or a plurality of PDSCHs for TCP ACK/NACK, VoIP UE, or RRC signal, a resource region can be allocated as shown in [case 2]. In case of [case 1], one NA information is sufficient for the NAICS UE to cancel/mitigate an interference signal that affects a required (desired) signal received from a serving base station. Yet, in case of [case 2], it is necessary for the NAICS UE to know all of the N number of NA information to cancel/mitigate an interference signal. Hence, an amount of NA information delivered to the NAICS UE or an amount of NA information to be estimated through blind detection is relatively increased and success probability of the blind detection is also relatively decreased. Hence, it may become difficult to efficiently cancel/mitigate an interference signal depending on a resource region allocated by an interference base station.

Scheduling information including information on a resource region allocated by an interference base station can be dynamically provided to the NAICS UE in a manner that a serving base station utilizes DCI (downlink control information). Yet, if a situation that backhaul delay exists between the serving base station and the interference base station is considered, it may be not preferable for the serving base station to receive DCI information from the interference base station and provide the DCI information to the NAICS UE. Moreover, since a signal field for allocating a resource region requires the biggest number of bits in the DCI, this signal transmission may generate overhead.

Due to the aforementioned reasons, the present invention proposes a method described in the following. Having received the information on the resource region allocated by the interference base station, the serving base station semi-statically provides the information to a UE and the UE can utilize the information as information for cancelling/mitigating an interference signal. The interference base station determines information on a resource region allocated by the interference base station corresponding to a prescribed frequency/time in advance and delivers the information to the serving base station at every determined period (e.g., 4 radio frames (40 ms)). The serving base station can inform the NAICS UE of the information through RRC signaling.

Embodiment 1

Information on a resource region allocated by an interference base station can be provided using a bitmap in a PRB pair unit. In particular, PRB bundling information can be represented using a bitmap according to a PRB pair. For clarity, assume that the interference base station delivers the information on the resource region allocation to a serving base station with respect to 15 PRB pairs and 2 subframes and the serving base station provides the information to a NAICS UE via RRC signaling. And, assume that an identical resource is allocated during two slots in a subframe. Table 5 shows the resource region allocation of the interference base station represented by a bitmap. In this case, the bitmap requires a length of 30 bits (15*2=30). The bitmap may have a sequential form in a manner that first 15 bits are displayed in a first subframe and another 15 bits are displayed in a second subframe.

TABLE 5

| PRB bundling | |
| --- | --- |
| 00110 01100 00000 | 00110 00000 00000 |

Figure 6:
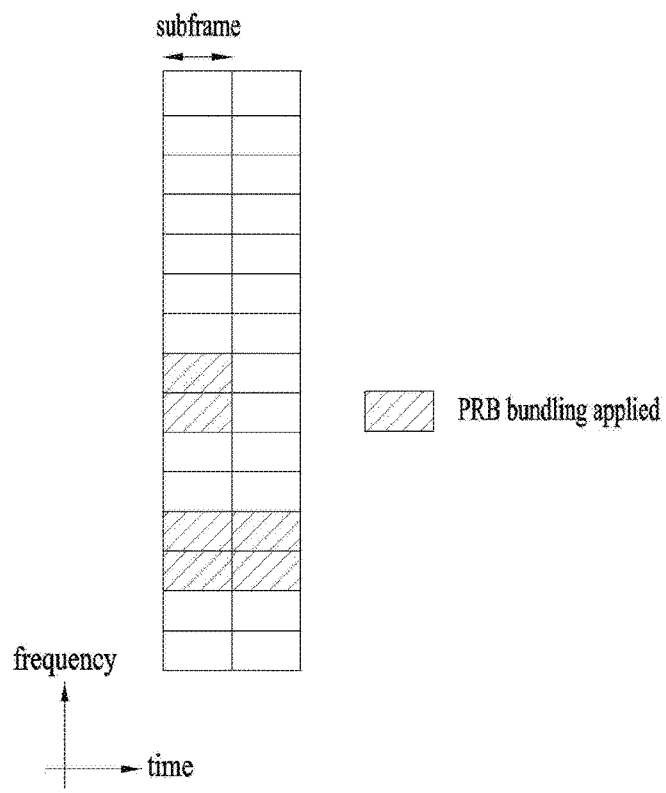
FIG. 6 is a diagram for PRB bundling applied to a specific resource region.

For example, as shown in FIG. 6, when it is assumed that PRB bundling is applied to a PRB pair position of a diagonal line area only, if a bit of a PRB bundling bitmap corresponds to 1, the interference base station applies the PRB bundling to a corresponding PRB pair. If the bit corresponds to 0, the interference base station does not apply the PRB bundling. In the bitmap, the PRB bundling is represented by at least two or more contiguous bits "1" and one "1" is unable to independently exist. An RB pair at which the PRB bundling starts is set to 1 only. How many RB pairs to be bundled can be determined according to a bandwidth of a neighboring cell or a bandwidth of an interference cell.

In order to help a NAICS operation of the NAICS UE, the serving base station or the interference base station can provide single "NA information" corresponding to bundled PRB pairs to PRB pairs to which the PRB bundling is applied (e.g., via higher layer signaling) and the serving base station or the interference base station can provide individual "NA information" to PRB pairs to which the PRB bundling is not applied in a PRB pair or a PRB unit (e.g., via higher layer signaling). Or, it may be able to make the NAICS UE infer NA information by performing blind detection without separately receiving the NA information from the serving base station or the interference base station.

If it is determined as the PRB bundling is applied to PRB pairs via the resource region allocation information, the NAICS UE assumes that the PRB bundling is applied to the PRB pairs and may be able to perform interference cancellation/mitigation on the PRB pairs in a bundling unit using "NA information" detected by blind detection performed in a bundling unit or "NA information" signaled from the serving base station or the interference base station.

In particular, the NAICS UE can perform more accurate channel estimation in a manner of performing channel estimation and interpolation from the interference base station through a DMRS of the PRB pairs to which the bundling is applied and may be then able to utilize the estimated channel for cancelling/mitigating interference.

For a PRB pair(s) to which the PRB bundling is not applied, the NAICS UE can perform interference cancellation/mitigation on the PRB pair(s) in a PRB pair unit or a PRB unit using "NA information" detected by blind detection performed in a PRB pair unit or a PRB unit or "NA information" signaled from the serving base station or the interference base station.

Embodiment 2

Information on a resource region allocated by an interference base station can be provided in a PRB pair unit using an integer form. In particular, PRB bundling information can be represented using an integer form according to a PRB pair. Table 6 shows an example of the information on the resource region allocated by the interference base station represented by an integer.

TABLE 6

| PRB bundling | |
| --- | --- |
| PRB bundling info | {0,1,0,1,0,1,0} |
| Bundling length | {2,2,2,2,9,2,11} |

As shown in Table 6, if it is assumed that PRB bundling is applied to a PRB pair position of a diagonal line area only, as shown in Table 6, information on whether or not the PRB bundling is performed and corresponding length information can be represented by an integer form. For example, if PRB bundling information corresponds to 1 and a corresponding bundling length corresponds to 2, the interference base station applies the PRB bundling to two PRB pairs. If the bundling length is greater than 3, bundling is performed in a manner of dividing the bundling length by a bundling unit according to a bandwidth of the interference base station. If the PRB bundling information corresponds to 0 and the corresponding bundling length corresponds to 9, the interference base does not apply the PRB bundling to 9 PRB pairs.

In order to help a NAICS operation of the NAICS UE, the serving base station or the interference base station can provide single NA information corresponding to bundled PRB pairs to PRB pairs to which the PRB bundling is applied and the serving base station or the interference base station can provide individual NA information to PRB pairs to which the PRB bundling is not applied in a PRB pair or a PRB unit. Or, it may be able to make the NAICS UE infer NA information by performing blind detection without separately receiving the NA information from the serving base station or the interference base station.

If it is determined as the PRB bundling is applied to PRB pairs via the resource region allocation information, the NAICS UE assumes that the PRB bundling is applied to the PRB pairs and may be able to perform interference cancellation/mitigation on the PRB pairs in a bundling unit using "NA information" detected by blind detection performed in a bundling unit or "NA information" signaled from the serving base station or the interference base station. For a PRB pair(s) to which the PRB bundling is not applied, the NAICS UE can perform interference cancellation/mitigation on the PRB pair(s) in a PRB pair unit or a PRB unit using NA information detected by blind detection performed in a PRB pair unit or a PRB unit or NA information signaled from the serving base station or the interference base station.

Embodiment 3

Regarding the embodiment 1 and the embodiment 2, if the resource region allocation information on whether or not bundling is performed is represented by a PRB pair unit, it may be required to have too much number of information. Hence, the information on the resource region allocated by the interference base station can be informed in an RB group (RBG) unit. To this end, the interference base station may perform scheduling in the RBG unit. In particular, the interference base station applies PRB bundling to all RBGs in which the PRB bundling is performed and does not apply the PRB bundling to all RBGs in which the PRB bundling is not performed.

In order to help a NAICS operation of the NAICS UE, the serving base station or the interference base station can provide (RBG size)/(bundling size) number of NA information to an RBG to which the PRB bundling is applied and the serving base station or the interference base station can provide individual NA information to an RBG to which the PRB bundling is not applied in a PRB pair or a PRB unit. Or, it may be able to make the NAICS UE infer NA information by performing blind detection without separately receiving the NA information from the serving base station or the interference base station.

If it is determined as the PRB bundling is applied to an RBG, the NAICS UE can perform interference cancellation/mitigation on the RBG in an RBG unit using NA information detected by blind detection performed in an RBG unit or NA information signaled from the serving base station or the interference base station. For an RBG to which the PRB bundling is not applied, the NAICS UE can perform interference cancellation/mitigation on the RBG in a PRB pair unit or a PRB unit using NA information detected by blind detection performed in a PRB pair unit or a PRB unit or NA information signaled from the serving base station or the interference base station. Or, the NAICS UE may not perform interference cancellation/mitigation on the RBG to which the PRB bundling is not applied.

Embodiment 4

Information on a resource region allocated by an interference base station can be provided using a bitmap in a subband unit. In particular, PRB bundling information can be represented using a bitmap according to a subband. To this end, the interference base station may perform scheduling in a subband unit. In particular, the interference base station applies PRB bundling to all subbands in which the PRB bundling is performed and does not apply the PRB bundling to all subbands in which the PRB bundling is not performed.

In order to help a NAICS operation of the NAICS UE, the serving base station or the interference base station can provide (subband size)/(bundling size) number of NA information to a subband to which the PRB bundling is applied and the serving base station or the interference base station can provide individual NA information to a subband to which the PRB bundling is not applied in a PRB pair unit or a PRB unit. Or, it may be able to make the NAICS UE infer NA information by performing blind detection without separately receiving the NA information from the serving base station or the interference base station.

If it is determined as the PRB bundling is applied to a subband through the resource region allocation information, the NAICS UE can perform interference cancellation/mitigation on the subband in a bundling unit using NA information detected by blind detection performed in a bundling unit or NA information provided by the serving base station or the interference base station. For a subband to which the PRB bundling is not applied, the NAICS UE can perform interference cancellation/mitigation on the subband in a PRB pair unit or a PRB unit using NA information detected by blind detection performed in a PRB pair unit or a PRB unit or NA information provided by the serving base station or the interference base station.

Embodiment 5

In case of a distributed resource allocation type, it is able to allocate a different resource to two slots in a subframe. Information on whether resource allocation corresponds to a localized type or a distributed type can be additionally indicated by 1-bit flag in a subframe unit. In order to help a NAICS operation of the NAICS UE, the serving base station or the interference base station can provide single NA information to PRB pairs to which PRB bundling is applied in a subframe corresponding to the localized type only. The serving base station or the interference base station can provide NA information to a PRB pair to which the PRB bundling is not applied according to a PRB pair or a PRB. Or, it may be able to make the NAICS UE infer NA information by performing blind detection without separately receiving the NA information from the serving base station or the interference base station.

If it is determined as the PRB bundling is applied to a PRB in a subframe only corresponding to resource allocation of a localized type through the resource region allocation information, the NAICS UE can perform interference cancellation/mitigation on the PRB in a bundling unit using NA information detected by blind detection performed in a bundling unit or NA information provided by the serving base station or the interference base station. If it is determined as the PRB bundling is not applied to a PRB in a subframe only corresponding to resource allocation of a localized type through the resource region allocation information, the NAICS UE can perform interference cancellation/mitigation on the PRB in a PRB pair unit or a PRB unit using NA information detected by blind detection performed in a PRB pair unit or a PRB unit or NA information provided by the serving base station or the interference base station.

In addition, it is able to deliver information on the resource allocation type (i.e., distributed or localized) of the interference base station to a UE in a time/frequency unit through semi-static signaling. In this case, as an example, the time unit may correspond to a single or a plurality of subframes. As an example, the frequency unit may correspond to 1 RB, an RBG consisting of a plurality of RBs, a PRG a subband, a system bandwidth, or the like. As a different example, a frequency unit to which distributed resource allocation is applied may correspond to a start and an end index of a VRB, a start index and a length of a VRB, and the like. Or, it is able to inform a UE of a value of the frequency unit in a manner of dividing the start index and the length by 4 and the UE is able to know the start index and the length of the VRB of an interference signal in a manner of multiplying the value by 4. It is able to inform the UE of a VRB index [4(n−1), 4(n−1)+1, 4(n−1)+2, 4(n−1)+3] using a bitmap of which information on whether or not a distributed resource is allocated is matched with a value of an $n^{th}$ bit.

The UE may assume that a base station is able to set the time/frequency unit to the UE or a corresponding resource allocation scheme is applied to scheduling of the interference base station during a predetermined specific time/frequency unit.

As a different example, the interference base station can semi-statically inform the UE that a localized resource allocation type is applied to a specific time/frequency domain only. The interference base station guarantees scheduling to which localized resource allocation is applied in the time/frequency domain. The interference base station can schedule time/frequency domain not corresponding to the localized resource allocation by selecting one from among the localized resource allocation and the distributed resource allocation and a UE can assume that both the localized resource allocation and the distributed resource allocation are available. In this case, as an example, a time unit may correspond to a single subframe or a plurality of subframes. As an example, a frequency unit may correspond to 1 RB, an RBG consisting of a plurality of RBs, a PRG, a subband, a system bandwidth and the like.

Or, the interference base station can semi-statically inform the UE that a distributed resource allocation type is applied to a specific time/frequency domain only. Similarly, the interference base station guarantees scheduling to which distributed resource allocation is applied in the time/frequency domain. In this case, as an example, a time unit may correspond to a single subframe or a plurality of subframes. As an example, a frequency unit may correspond to 1 RB, an RBG consisting of a plurality of RBs, a PRG, a subband, a system bandwidth and the like. As a different example, a frequency unit to which distributed resource allocation is applied may correspond to a start and an end index of a VRB, a start index and a length of a VRB, and the like. Or, it is able to inform a UE of a value of the frequency unit in a manner of dividing the start index and the length by 4 and the UE is able to know the start index and the length of the VRB of an interference signal in a manner of multiplying the value by 4. It is also able to inform the UE of a VRB index [4(n−1), 4(n−1)+1, 4(n−1)+2, 4(n−1)+3] using a bitmap of which information on whether or not a distributed resource is allocated is matched with a value of an $n^{th}$ bit.

Or, the interference base station can semi-statically informs the UE that a resource allocation type 0 is applied to a specific time/frequency domain only. In this case, the interference base station guarantees scheduling scheduled in an RBG unit in the time/frequency domain and the NAICS UE can assume that an interference signal is scheduled in the RBG unit in the time/frequency domain. If a RBG does not include information on whether or not PRB bundling is applied to an interference signal, the NAICS UE can assume that the PRB bundling is not applied to the RBG The interference base station can perform UE scheduling in a manner of applying a random resource allocation type to the remaining domains except the time/frequency domain in which the resource allocation type 0 is guaranteed. The NAICS UE also assumes that interference is able to be transmitted by the random resource allocation type in the remaining domains.

The interference base station can informs the UE that a resource allocation type 0 is applied to a specific time/frequency domain only and PRB bundling is applied to the time/frequency domain at the same time. In this case, the interference base station guarantees scheduling in the time/frequency domain in an RBG unit to which an identical precoding is applied and the NAICS UE can assume that an interference signal is scheduled in the RBG unit to which the identical precoding is applied in the time/frequency domain. The NAICS UE assumes that the interference base station is able to perform random scheduling in the remaining domains except the time/frequency domain. Similarly, the interference base station can inform the UE that the resource allocation type 0 is applied to the specific time/frequency domain only and the PRB bundling is not applied to the specific time/frequency domain.

Embodiment 6

Resource region allocation information of an interference base station can be provided in a PRB unit. In particular, it is able to display a flag indicating whether or not there is information on a resource allocation type and information on the resource allocation type as well as PRB bundling information according to a PRB. For example, the resource region allocation information includes the information on the resource allocation type and the PRB bundling information only when the flag corresponds to 1. If the flag corresponds to 0, the resource region allocation information can include the bundling information only. A resource allocation type and information on whether or not PRB bundling is applied are displayed in response to each PRB. Or, the information on the resource allocation type can be displayed all the time without the flag. The serving base station or the interference base station can provide single NA information to PRBs to which the PRB bundling is applied and provide individual NA information to PRBs to which the PRB bundling is not applied in a PRB unit.

If NA information is provided to a PRB only among a PRB pair, information on whether the PRB corresponds to a first slot or a second slot can be promised with the NAICS UE in advance. Or, the information can be signaled to the NAICS UE. Or, the NA information can be provided to a PRB corresponding to resource allocation of a localized type only and the NA information may not be provided to a PRB corresponding to resource allocation of a distributed type. Or, it may be able to make the NAICS UE infer the NA information by performing blind detection without separately receiving the NA information from the serving base station or the interference base station.

If it is determined as the PRB bundling is applied to PRBs, the NAICS UE can perform interference cancellation/mitigation on the PRBs in a bundling unit using NA information detected by blind detection performed in a bundling unit or NA information received from the serving base station or the interference base station. For a PRB to which the PRB bundling is not applied, the NAICS UE can perform interference cancellation/mitigation on the PRB in a PRB unit using NA information detected by blind detection performed in a PRB unit or NA information received from the serving base station or the interference base station. Or, the NAICS UE performs interference cancellation/mitigation on a PRB corresponding to resource allocation of a localized type only using NA information received from the serving base station or the interference base station or NA information detected by blind detection. The NAICS UE may not perform interference cancellation/mitigation on a PRB corresponding to resource allocation of a distributed type without performing blind detection.

Embodiment 7

Information on a resource region allocated by an interference base station to be provided by one embodiment of the present invention can include information on an RB configuration of PDSCH as well as the aforementioned information, i.e., PRB bundling information and a resource allocation type. If an amount of data such as a VoIP (voice over internet protocol) is small, a base station transmits single PDSCH to a single PRB. If an amount of data is large, the base station transmits single PDSCH to multiple PRBs. If the interference base station schedules a plurality of PDSCHs consisting of single PRBs to an RB area scheduled to the NAICS UE, the NAICS UE requires all information corresponding to each of a plurality of the PDSCHs to perform interference cancellation/mitigation and this may cause excessive signaling/blind detection overhead. Hence, the interference base station can inform the NAICS UE of information on whether each PRB corresponds to PDSCH consisting of single PRB or PDSCH consisting of multiple PRBs together with the resource region allocation information to help the NAICS UE to perform interference cancellation/mitigation.

When the interference base station transmits single PDSCH to multiple PRBs, the multiple PRBs have an identical interference characteristic. For example, the NAICS UE receives an interference signal transmitted by an identical MCS, an identical transmission scheme, and identical transmission power from the multiple PRBs. When the identical interference characteristic is referred to as interference homogeneity (IH), if the NAICS UE knows a time frequency resource region in which the IH is guaranteed in advance, it may be efficient for the NAICS UE to perform interference cancellation/mitigation. For example, when the NAICS UE intends to identify MCS and the like of interference through blind detection, the NAICS UE can increase reliability of the BD by performing the blind detection or decoding (BD) on the whole of the resource regions in which the IH is guaranteed. Hence, the interference base station can schedule a single PDSCH with a bigger resource unit (e.g., an RBG unit) for the NAICS UE. The interference base station or the serving base station can inform the NAICS UE of a scheduling resource unit and/or a time frequency resource to which the scheduling resource unit is to be applied via higher layer signaling and the like.

Moreover, the interference base station may promise to schedule a single PDSCH to the whole of RBs and the interference base station can inform the NAICS UE of a time resource (e.g., subframe number) to which the scheduling is to be applied directly or through the serving base station using higher layer signaling. If the NAICS UE does not have BD capability capable of identifying interference information (MCS, transmission scheme, PMI, transmission power), the interference base station or the serving base station can inform the NAICS UE of the interference information through a control channel in a subframe in which a scheduling unit is promised.

The interference base station can inform a PRB of information on whether the PRB belongs to PDSCH consisting of a single PRB or PDSCH consisting of multiple PRBs. The interference base station can provide information on a resource allocation type and information on PRB bundling together to the PRB belonging to the PDSCH consisting of multiple PRBs. Or, the interference base station can inform the PRB belonging to the PDSCH consisting of multiple PRBs of information on whether or not the PDSCH corresponds to PDSCH identical to a previous RB. Moreover, if the PDSCH corresponds to the PDSCH identical to the previous RB, the interference base station can also inform the PRB of whether or not an identical PMI is used. Or, the interference base station can also inform the PRB of information on whether or not the corresponding RB is muted. The aforementioned examples can be represented as Table 7 in the following.

TABLE 7

| bit value | PDSCH type | resource allocation type | PRB bundling | Etc. |
|---|---|---|---|---|
| 0 | single PRB | — | — | |
| 1 | multiple PRBs | 0/1 | X | |
| 2 | multiple PRBs | 0/1 | O | |
| 3 | multiple PRBs | 2 | X | |
| 4 | multiple PRBs | 2 | O | |
| 5 | multiple PRBs | same with previous RB | same with previous RB | same PDSCH with previous RB with same PMI |
| 6 | multiple PRBs | same with previous RB | same with previous RB | same PDSCH with previous RB with different PMI |
| 7 | — | — | — | muting RB |

The serving base station or the interference base station can provide NA information such as (number of RBs consisting of PDSCH)/(bundling size) to a PRB pair or PRBs corresponding to the PDSCH to which PRB bundling is applied. The serving base station or the interference base station can provide individual NA information to a PRB pair or PRBs corresponding to PDSCH to which PRB bundling is not applied in a PRB pair unit or a PRB unit. Or, it may be able to make the NAICS UE infer NA information by performing blind detection without separately receiving the NA information from the serving base station or the interference base station.

If it is determined as the PRB bundling is applied to a PRB pair or PRBs through the resource region allocation information, the NAICS UE can perform interference cancellation/mitigation on the PRB pair or the PRBs in a bundling unit using NA information detected by blind detection performed in a bundling unit or NA information provided by the serving base station or the interference base station. For a PRB pair or PRBs to which the PRB bundling is not applied, the NAICS UE can perform interference cancellation/mitigation on the PRB pair or the PRBs in a PRB pair unit or a PRB unit using NA information detected by blind detection performed in a PRB pair unit or a PRB unit or NA information provided by the serving base station or the interference base station. If the number of PRB pairs or PRBs corresponding to single PDSCH is equal to or less than a prescribed number, it is able to restrict the NAICS UE not to perform blind detection on the corresponding PRBs and not to perform interference cancellation/mitigation.

Embodiment 8

If a PRB pair is allocated using distributed resource allocation and an interference signal exists in both slots, resource region allocation of a first slot and resource region allocation of a second slot are different from each other. In this case, if NA information on the two slots is informed, it may cause considerable signaling overhead. When the NAICS UE performs blind detection, since it is necessary to perform the blind detection according to each slot, calculation complexity increases and the number of samples is reduced to a half, thereby degrading performance of the blind detection. As shown in FIG. 3, according to LTE system, a downlink subframe includes 2 slots and first to third OFDM symbol of the first slot are assigned to a control channel. In particular, the number of OFDM symbols capable of taking an advantage of the NAICS is greater in the second slot compared to the first slot. Hence, it may be preferable to perform interference cancellation/mitigation in the second slot. Hence, if a PRB corresponds to a distributed resource allocation type, it is proposed that the interference base station provides resource region allocation information corresponding to the second slot and NA information only.

Hence, if it is determined as the PRB bundling is applied to PRBs through the resource region allocation information, the NAICS UE can perform interference cancellation/mitigation on PRBs corresponding to a second slot only in a bundling unit using NA information detected by blind detection performed in a bundling unit or NA information provided by the serving base station or the interference base station. For PRBs to which the PRB bundling is not applied, the NAICS UE can perform interference cancellation/mitigation on PRBs corresponding to the second slot only in a PRB unit using NA information detected by blind detection performed in a PRB unit or NA information provided by the serving base station or the interference base station.

For example, if the interference base station transmits a data of a UE 1 and a data of a UE 2 of interference cell to a slot 1 and a slot 2 of an RB 1, respectively, the NAICS UE of the serving cell receiving data in the RB 1 can perform NAICS in the slot 2 only. The NAICS UE receives information necessary for performing NAICS for the slot 2 from the serving cell or the interference cell and may be able to perform NAICS using the information.

Embodiment 9

Although a PRB pair is allocated using distributed resource allocation, an interference signal may exist in one slot only among two slots. If the NAICS UE performs interference cancellation/mitigation on the slot in which the interference signal does not exist, an impact of the interference signal may become stronger, thereby degrading performance. If the interference base station informs the NAICS UE of not only information on PRB bundling and information on a resource allocation type in a PRB pair unit but also additional information on whether or not there exist interference PDSCH according to a slot at the same time, it may be able to help the NAICS UE to perform interference cancellation/mitigation. The interference base station can semi-statically or dynamically provide the UE with the information on whether or not there exist the PDSCH according to each slot with the respect to an RB in which the distributed resource allocation is performed. Hence, the serving base station or the interference base station can provide the NAICS UE with NA information on PRBs of a slot in which the PDSCH exists only.

If it is determined as the PRB bundling is applied to PRBs and PDSCH exists in a slot of the PRBs through the resource region allocation information, the NAICS UE can perform interference cancellation/mitigation on the PRBs in a bundling unit using NA information detected by blind detection performed in a bundling unit or NA information signaled by the serving base station or the interference base station. For PRBs to which the PRB bundling is not applied and the PRBs of a slot in which PDSCH exists, the NAICS UE can perform interference cancellation/mitigation on the PRBs in a PRB unit using NA information detected by blind detection performed in a PRB unit or NA information signaled by the serving base station or the interference base station.

For example, if the interference base station assigns single PDSCH to a slot 1 of an RB 1 and a slot 2 of an RB 10 using distributed resource allocation and a slot 2 of the RB 1 does not transmit data, the NAICS UE receiving a desired signal through the slot 1 and the slot 2 of the RB 1 performs interference cancellation/mitigation in the slot 1 only and does not perform interference cancellation/mitigation in the slot 2 of the RB 1.

Embodiment 10

When the interference base station performs distributed resource allocation on a specific RB, an interference characteristic may vary according to each of slots constructing one PRB pair. Hence, it may be preferable for the NAICS UE to identify whether an RB performing NAICS corresponds to a localized resource allocation type or a distributed resource allocation type and perform NAICS based on interference information different from each other according to each slot. To this end, it is proposed that the interference base station informs a specific resource of information on a resource allocation type and NA information on one slot among two slots of an RB is provided to the serving base station only with respect to a resource corresponding to the distributed resource allocation. The serving base station semi-statically provides the UE with the information on the resource allocation type and the NA information or provides the UE with the information by utilizing a dynamic signal. The interference base station also provides the UE with an index indicating a slot corresponding to the information. Or, the interference base station and the serving base station can promise a specific slot in which the NA information is provided in advance.

Table 8 in the following shows an RB gap according to a system bandwidth used for mapping a virtual RB to a PRB in distributed resource allocation. As shown in Table 8, in a system equal to or less than 49 RBs, a first gap value ($g_1$) is used only. On the contrary, in a system equal to or greater than 50 RBs, one of the first gap value ($g_1$) and a second gap value ($g_2$) can be used. Hence, the interference base station can semi-statically inform the UE of an RB gap value used for a resource corresponding to distributed resource allocation or inform the UE of the RB gap value by utilizing a dynamic signal. Or, scheduling can be performed using an RB gap value predetermined via coordination between the interference base station and the serving base station. The NAICS UE can perform interference cancellation/mitigation under an assumption that scheduling has been performed by the interference base station using the promised RB gap value.

TABLE 8

| System BW, $N_{RB}$ | RBG Size (P) | Gap 1, $g_1$ | Gap 2, $g_2$ |
|---|---|---|---|
| 6-10 | 1 | $N_{RB}/2$ | N/A |
| 11 | 2 | 4 | N/A |
| 12-19 | 2 | 8 | N/A |
| 20-26 | 2 | 12 | N/A |
| 27-44 | 3 | 18 | N/A |
| 45-49 | 3 | 27 | N/A |
| 50-63 | 3 | 27 | 9 |
| 64-79 | 4 | 32 | 16 |
| 80-110 | 4 | 48 | 16 |

The NAICS UE performs interference cancellation/mitigation by utilizing NA information received from the serving base station or the interference base station or NA information obtained by performing blind detection in a promised slot (e.g., first slot). In the remaining slot (e.g., second slot), the NAICS UE searches for an RB index of a counterpart slot that forms a pair with an RB scheduled via an RB gap value according to a system bandwidth and may be then able to perform interference cancellation/mitigation by utilizing NA information of the scheduled RB.

In particular, the NAICS UE obtains NA information of the remaining slot from the NA information of the promised slot with reference to the first gap value in the system equal to or less than 49 RBs.

The NA information of the remaining slot is obtained from the NA information of the promised slot with reference to a promised or provided RB gap value in the system equal to or greater than 50 RBs. For example, the interference base station uses the first gap value only for the NAICS UE and the NAICS UE can perform interference cancellation/mitigation using the first gap value only among the two gap values. Or, the interference base station semi-statically determines which value is to be used among the first and the second gap value and may be able to deliver information on the decision to the serving base station through a backhaul link. The serving base station can provide the information on the gap value to the NAICS UE via RRC signaling. Having received the information, the NAICS UE can perform interference cancellation/mitigation according to the gap value. Or, the interference base station can dynamically signal a gap value to the NAICS UE.

Or, in the system equal to or greater than 50 RBs, the NAICS UE does not receive the gap value. The NAICS UE performs interference cancellation/mitigation in a promised (designated) slot only and does not perform interference cancellation/mitigation in the remaining slot.

Figure 7:
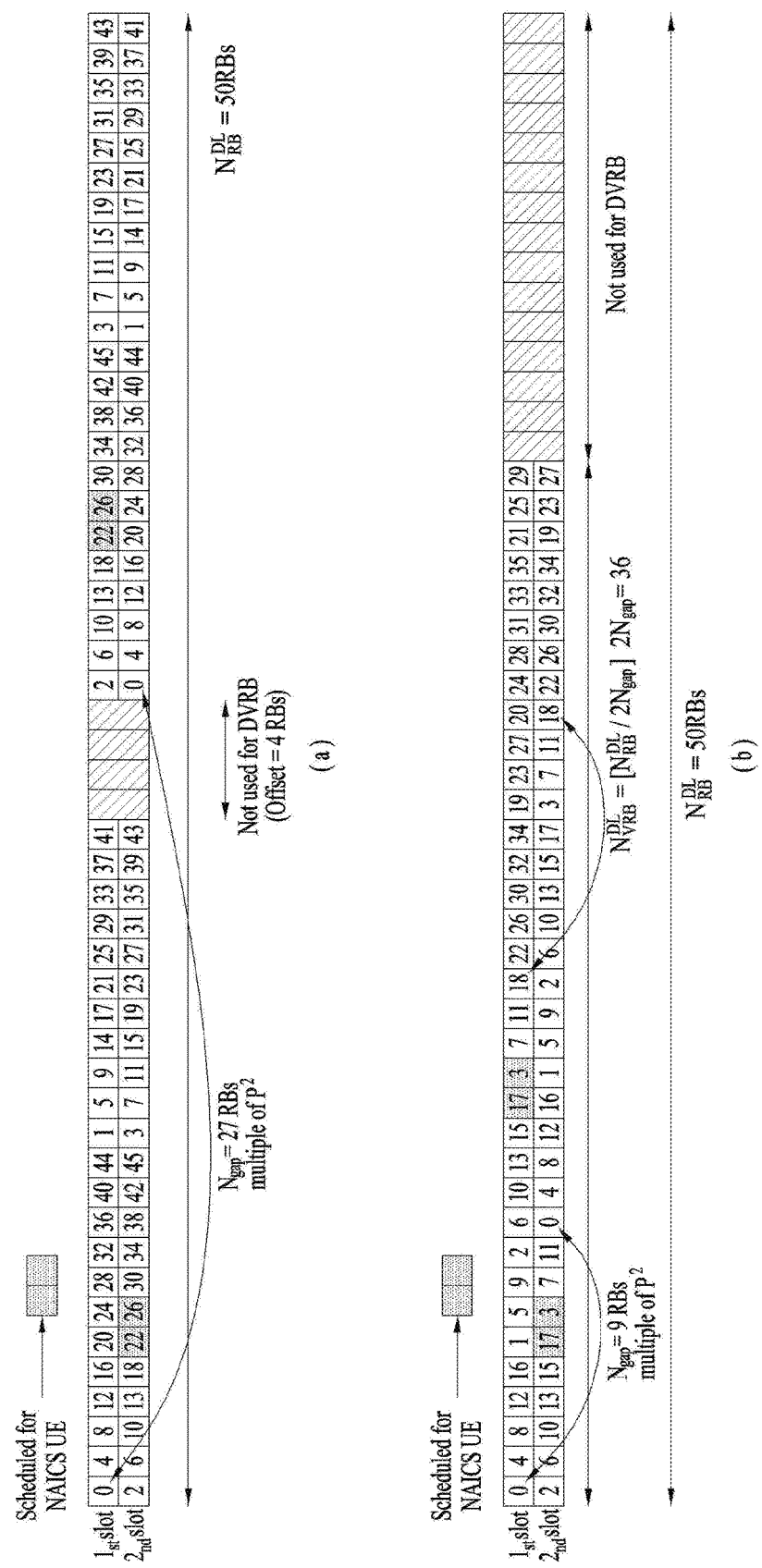
FIG. 7 is a diagram for mapping of a VRB and a PRB.

For example, when a system bandwidth corresponds to 50 RBs, mapping of a VRB and mapping of a PRB using a first gap value and a second gap value are shown in FIG. 7 (*a*)

and FIG. 7 (b), respectively. In this case, assume that NA information on a first slot is provided only. If it is assumed that the NAICS UE is scheduled as shown in FIG. 7 (a), NA information corresponding to RB 20 and RB 24 of the first slot is provided to the NAICS UE only, and the interference base station uses the first gap value, since NA information on a second slot is not provided to the NAICS UE among RB 22 and RB 26 scheduled for the NAICS UE, the NAICS UE obtains the NA information on the second slot from NA information corresponding to RB 22 and RB 26 of the first slot and may be then able to perform interference cancellation/mitigation using the NA information on the second slot.

Similarly, if it is assumed that the NAICS UE is scheduled as shown in FIG. 7 (b), NA information on the first slot (NA information corresponding to RB 16 and RB 1 of the first slot) is provided to the NAICS UE only, and the interference base station uses the second gap value, the NAICS UE obtains NA information on a second slot from NA information corresponding to RB 17 and RB 3 of the first slot and may be then able to perform interference cancellation/mitigation using the NA information on the second slot.

Figure 8:
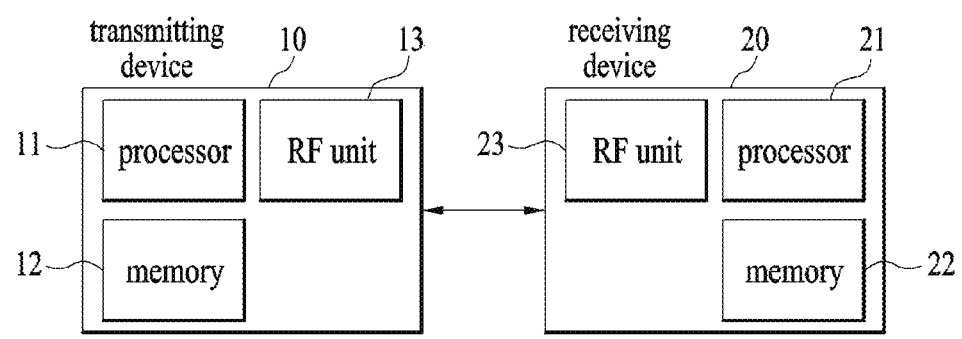
FIG. 8 is a block diagram for a device configured to implement embodiment(s) of the present invention.

FIG. 8 is a block diagram of a transmitting device 10 and a receiving device 20 configured to implement exemplary embodiments of the present invention. Referring to FIG. 8, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method of receiving information to be used for cancelling interference, which is performed by a mobile terminal, comprising:
   receiving, from a serving base station, resource region allocation information of a neighboring base station to be used for cancelling an interference signal; and
   using the resource region allocation information to cancel the interference signal from a downlink signal,
   wherein the resource region allocation information includes at least one of: physical resource block (PRB) bundling information, resource allocation type or resource block (RB) configuration of a physical downlink shared channel (PDSCH) transmitted by the neighboring base station, and
   wherein the RB configuration indicates whether each PRB corresponds to the PDSCH comprised of a single PRB or the PDSCH comprised of multiple PRBs.

2. The method of claim 1, further comprising receiving control information to be used for detecting the interference signal, corresponding to the resource region allocation information.

3. The method of claim 2, further comprising blind detecting the interference signal in a resource indicated by the resource region allocation information using the control information.

4. The method of claim 1, wherein the resource region allocation information indicates resources having an identical interference characteristic.

5. The method of claim 1, wherein the resource region allocation information indicates resources to which an identical PMI is applied.

6. The method of claim 1, wherein the resource region allocation information includes an indicated RB that corresponds to the same PDSCH as a previous RB when the indicated RB corresponds to the PDSCH comprised of multiple PRBs.

7. The method of claim 6, wherein the resource region allocation information includes whether a precoding matrix indicator (PMI) used for the indicated RB is the same as the previous RB when the RB corresponds to the same PDSCH as the previous RB.

8. A mobile terminal configured to receive information to be used for cancelling interference, comprising:
   a radio frequency (RF) unit; and
   a processor configured to control the RF unit, the processor configured to receive, from a serving base station, resource region allocation information of a neighboring cell to be used for cancelling an interference signal, and use the resource region allocation information to cancel the interference signal from a downlink signal,
   wherein the resource region allocation information includes at least one of: physical resource block (PRB) bundling information, resource allocation type or resource block (RB) configuration of a physical downlink shared channel (PDSCH) transmitted by the neighboring base station, and
   wherein the RB configuration indicates whether each PRB corresponds to the PDSCH comprised of a single PRB or the PDSCH comprised of multiple PRBs.

9. The mobile terminal of claim 8, wherein the processor is further configured to receive control information to be used for detecting the interference signal, corresponding to the resource region allocation information.

10. The mobile terminal of claim 9, wherein the processor is further configured to blind detect the interference signal in a resource indicated by the resource region allocation information using the control information.

11. The mobile terminal of claim 8, wherein the resource region allocation information indicates resources having an identical interference characteristic.

12. The mobile terminal of claim 8, wherein the resource region allocation information indicates resources to which an identical PMI is applied.

13. The mobile terminal of claim 8, wherein the resource region allocation information includes an indicated RB that corresponds to the same PDSCH as a previous RB when the indicated RB corresponds to the PDSCH comprised of multiple PRBs.

14. The mobile terminal of claim 13, wherein the resource region allocation information includes whether a precoding matrix indicator (PMI) used for the indicated RB is the same as the previous RB when the RB corresponds to the same PDSCH as the previous RB.

* * * * *